June 9, 1953  E. V. MORLEY  2,641,293
HIGH-POWERED LOCK NUT
Filed April 24, 1950  2 Sheets-Sheet 1
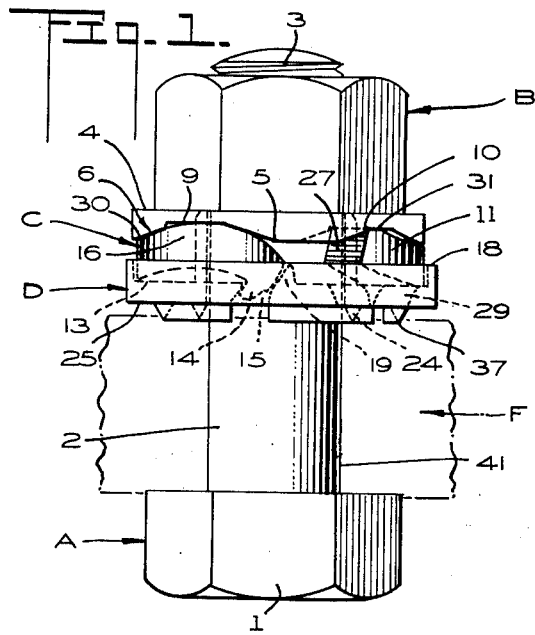
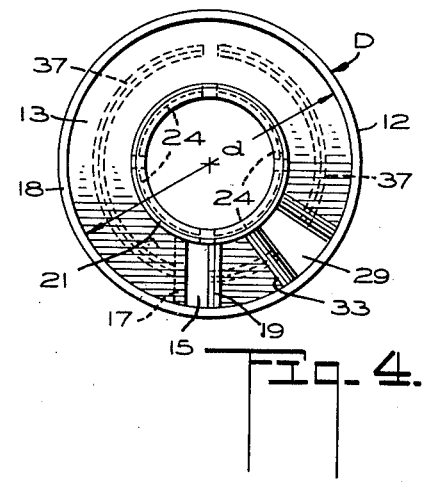
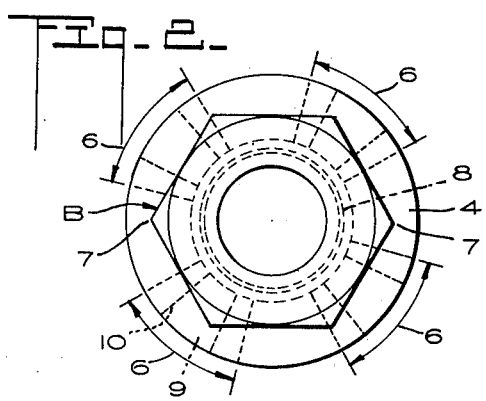
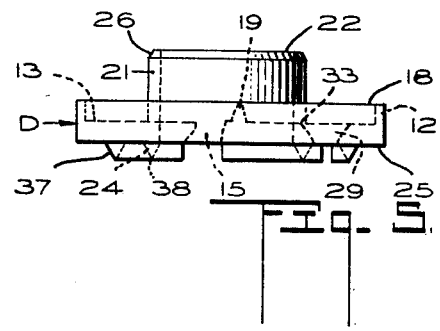
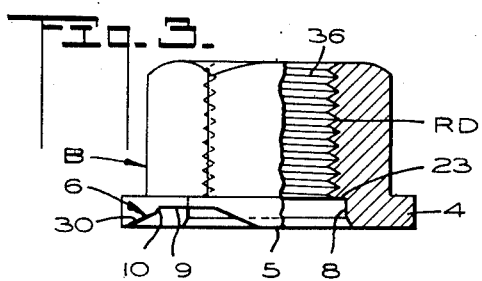
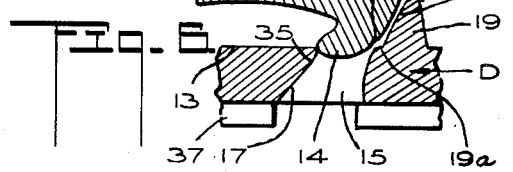
INVENTOR.
EARLE VICTOR MORLEY
BY
Munn, Liddy & Glaccum
ATTORNEYS

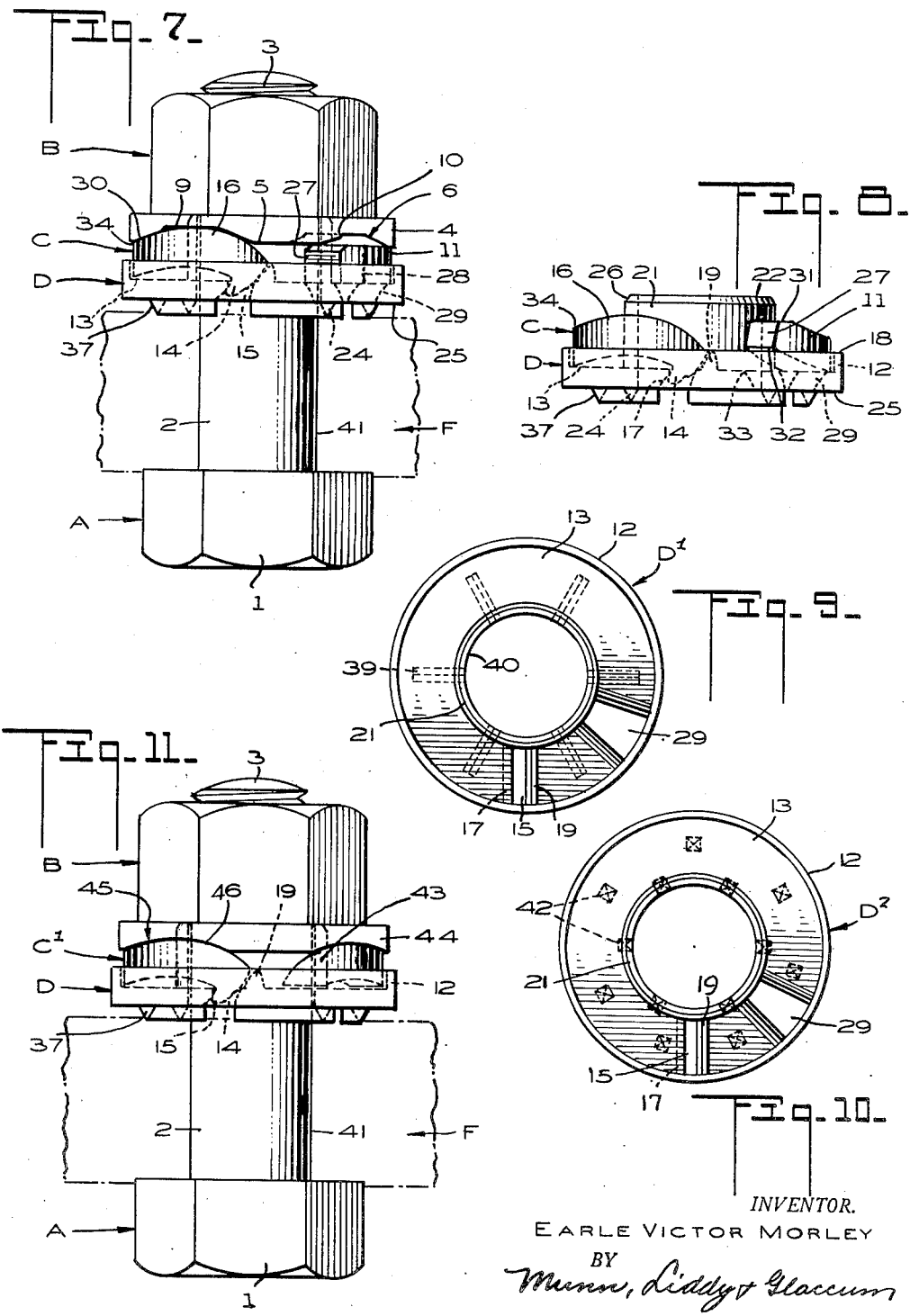

Patented June 9, 1953

2,641,293

UNITED STATES PATENT OFFICE 2,641,293

HIGH-POWERED LOCK NUT

Earle Victor Morley, Oakland, Calif.

Application April 24, 1950, Serial No. 157,834

5 Claims. (Cl. 151—41.5)

The present invention relates to improvements in a high-powered lock nut to take up slack where severe torsional stress or strain is encountered, as on aircraft, locomotives or sea-going vessels. It employs a bushed ring to which is fastened a high-powered spring lock washer adapted for coordination.

This invention consists of the combinations, constructions, and arrangement of parts, as hereinafter described and claimed.

The two principal parts of my present invention—a flanged nut and a bushed ring—may be applied separately. I have shown the construction of the principal parts of this device as being adapted to a drop forge, hot or cold pressed method of production.

More specifically described, the spring lock washer is provided with raised portions and a spring toe, which enter notches fashioned in the flanged nut. In the event that this toe should break while in service, the raised portions of the washer will be retained in the notches, absorbing vibration and restraining the flanged nut against loosening.

Other objects and advantages will appear as the specification continues, and the novel features will be set forth in the claims hereunto appended.

This application is a continuation-in-part of my earlier copending case, Serial No. 73,932, now abandoned, filed in the United States Patent Office on February 1, 1949.

For a better understanding of this invention, reference should be had to the accompanying drawings, forming part of this application, in which:

Figure 1 is an elevational view of a bolt having my high-powered lock nut applied thereto;

Figure 2 is a top plan view of the flanged nut;

Figure 3 is an elevational view of the flanged nut, partly in section;

Figure 4 is a top plan view of the bushed ring;

Figure 5 is an elevational view of Figure 4;

Figure 6 is an enlarged view disclosing the manner in which the spring lock washer is forced into engagement with the bushed ring;

Figure 7 is a view similar to Figure 1, and illustrating one of the raised portions of the spring lock washer confined in a notch of the flanged nut, and restraining the nut from turning, should the toe of the spring washer become broken while in use;

Figure 8 is an elevational view of the bushed ring having the high-powered spring lock washer anchored thereto;

Figures 9 and 10 are plan views of modified rings; and

Figure 11 is a modification of the ring and spring washer, designed to eliminate the need of a tool to release the spring toe from the notch.

While I have shown only the preferred forms of my invention, it should be understood that various changes, or modifications may be made within the scope of the appended claims without departing from the spirit thereof.

Referring to the drawings, I show a bolt, indicated generally at A. This bolt includes a head 1, and a shank 2, the latter having its upper end threaded as at 3.

In carrying out a step-by-step description of my invention, I show a nut B and a flange 4 made in one piece. The underneath face 5 of this flange contains a number of notches 6. I show the outer diameter of the flange 4 as exceeding the maximum width of the nut between diametrically-opposed apexes 7 of the nut (see Figure 2). The flange 4 contains a bore 8. The depth of the bore 8 equals the thickness of the flange 4, but may be made to any depth, with height of a bushing 21 altered to accord.

In Figures 1, 3 and 7, I show the flanged nut, with the notches 6 having a base 9 parallel with the face 5 of the flanged nut. The end walls 10 of these notches are shown as forming an obtuse angle with the bases 9 so that a spring toe 11 of a high-powered spring washer C may be lowered for removal of the flanged nut.

A ring D is shown as containing a peripheral retaining wall 12, surrounding a bed 13. The high-powered spring washer C is fastened upon this bed by means of a hook-shaped downward extension 14, encased in a diametric slot 15 extending across the width of the bed. The spring washer C is corrugated when in its natural state free of pressure (see Figure 8). When the raised portion 16 of the high-powered spring washer C nearest the downward extension 14 springs up normally, while free from the pressure of the flange 4, the downward extension 14 becomes locked to the angular wall 17 of the slot 15. The spring washer is provided with three of the raised portions 16, which correspond to the spacings of the notches 6.

For the purpose of assembly, the spring washer C is pressed to the bed 13 by a hydraulic device E or other means (see Figure 6) so that the downward extension 14 is vertical, thus forcing it into the slot 15. Upon release of pressure, the high-powered spring washer is locked to the ring D (see Figure 8). The end 14 of the spring washer C abutting against a bulkhead 19 of the ring D is provided with a groove 14a coacting with a shoulder 19a in the bulkhead 19 as a fulcrum to facilitate entry of the toe 14 into the slot 15.

Due to the spreading factor, the outside diameter $d$ of the bed 13 (see Figure 4) should be greater than the outside diameter of the spring washer C when not in use. The distance from the bed 13 to the top 18 of the retaining wall 12 is shown as being about one-half the thickness of the spring washer.

The bulkhead 19 rises adjacent to the diametric slot 15 to prevent the spring washer from revolving with the flanged nut should the extension 14 break off while in service. This bulkhead also serves as a restraining factor in keeping the extension 14 pressed against the angular wall 17, thus retaining the spring washer in the ring when not in use (see Figure 8).

The angle of the slightly-curved wall 20 of the bulkhead (see Figure 6) should be such that the raised portion 16 of the spring washer C nearest the downward extension 14 will be allowed to resume its normal height when not in use. The wall 20 is shown as having a slightly steeper angle than the angular wall 17.

A bushing 21 rises from the inside diameter of the bed 13 to a sufficient height so that the top 22 of this bushing presses flush to the seat 23 (see Figure 3) of the bore 8 while the spring washer C is pressed down by the flange 4. Four curved gables, indicated at 24 (see Figures 4, 5 and 8) extend from the bottom surface 25 of the ring D, directly under the bushing 21, and are adapted to penetrate, to some extent, the surface of the object F under revolving pressure of the seat 23 upon the top surface 22 of the bushing 21. The bushing 21 is bevelled on its outer edge at 26 (see Figure 5) to facilitate fitting this bushing to the bore 8.

The high-powered spring washer C has an upturned toe 11, previously mentioned, which is adapted to enter the recesses 6 to provide a ratchet-pawl arrangement. The spring toe allows the nut B to be tightened upon the threaded shank 2 of the bolt A, but will arrest loosening of the nut. The end 27 of the toe 11 is sufficiently spaced from the bulkhead 19 so that this toe will arrest loosening of the flanged nut while the three high spots 16 of the spring washer are retained in three equally spaced notches 6.

In Figure 7 an arrangement is shown whereby, should the spring toe 11 break while in service, the raised portions 16 of the spring washer C, retained in the notches 6, will absorb vibration and restrain the flanged nut from turning. A break in the spring washer is suggested at 28. The spacing of the notches 6 is equalized (see Figure 2) so that the spring toe 11 and the high spots 16 will spring into the notches with each quarter turn of the flanged nut. Accordingly, the spring toe 11 is spaced from the bulkhead 19. An opening 29 through the bed 13 permits the toe 11 to be released freely. The end walls 10 of the notches 6 conjoin with a taper-off 30 to prevent shearing the spring washer C when the flanged nut is loosened. The top edge of the toe is beveled at 31 to facilitate release of the flanged nut (see Figure 8). The bottom edge 32 of the spring toe 11 should clear the top edge 33 of the opening 29 nearest to the bulkhead 19 (see Figures 4, 5 and 8).

In the event the spring washer should break at one of the low spots 34, the remainder can be removed by punching out the downward extension 14 from the reverse side of the slot 15.

I show the upper edge 35 of the angular wall 17, where it converges with the bed 13, as being rounded to prevent chipping, should it become necessary to remove the spring washer (see Figure 6).

In consideration of its conjunction with the bushing 21, the inside diameter of the seat 8 should be greater than the root diameter RD of the nut threads 36 (see Figure 3). These threads may be of any suitable type.

Arcuate gables 37 project from the bottom surface 25 of the ring D. It will be understood that the arcuate gables 37, when applied to a metal surface, will support pressure exerted by the hi-powered spring washer C, while the bottom edges 38 of the curved gables 24 (see Figure 5) will penetrate the metal surface to some extent under revolving pressure of the flanged nut.

In Figure 9, I show a modified ring D1 having a number of radial gables 39 extending outward from the inside diameter 40 of the ring D1. This modification is intended to meet a condition where the diameter of the bore 41 in the object F is greater than the bottom edges 38 of the curved gables 24 which they replace (see Figure 5).

Figure 10 illustrates another modified ring D2 having a plurality of pyramids 42 projecting downwardly from its underneath surface. These pyramids are adapted to enter the object F to preclude the ring D2 from turning.

Figure 11 illustrates a modification of the ring and spring washer, designed to eliminate the need of a tool for releasing the spring toe 11 from the notch 6. The bottom end of the downwardly turned spring toe 43 in this modification is rounded for a sliding movement under pressure, and the opening 29, previously described, is eliminated. In Figure 11, the flange 44 is provided with four curved notches 45 arranged to receive a corresponding number of raised portions 46 of the modified spring washer C1.

The component parts of this device, either in the preferred form, or the modifications, may be case-hardened, either fully or in part. The dimensions of the various parts of this device may be modified as desired.

I claim:

1. In a lock nut: a ring adapted to receive a shank of a bolt; the ring having a radial slot therein with an angular wall; and a resilient split washer having a hook-shaped end adapted to enter the slot and a raised curved portion disposed adjacent to the hook; the angle of the hook being greater than the angular wall of the slot so that the curved portion has to be momentarily flattened to permit the hook to enter the slot; the curved portion upon returning to normal position, holding the hook against the angular wall of the slot for anchoring the washer to the ring.

2. In a lock nut: a ring adapted to receive a shank of a bolt; the ring having a radial slot therein with an angular wall; and a resilient split washer having a hook-shaped end adapted to enter the slot and a raised curved portion disposed adjacent to the hook; the angle of the hook being greater than the angular wall of the slot so that the curved portion has to be momentarily flattened to permit the hook to enter the slot; the curved portion upon returning to normal position, holding the hook against the angular wall of the slot for anchoring the washer to the ring; the other end of the washer being turned in an opposite direction to the hook to constitute a spring pawl.

3. In a lock nut: a ring adapted to receive a shank of a bolt; the ring having an annular washer-receiving bed; the ring having a radial slot in its bed with an angular wall; and a resilient split washer disposed in the bed and having a hook-shaped end adapted to enter the slot; the washer having a raised curved portion disposed adjacent to the hook; the angle of the hook being greater than the angular wall of the slot so that the curved portion has to be momentarily flattened to permit the hook to enter the slot; the curved portion upon returning to normal position, holding the hook against the angular wall of the slot for anchoring the washer to the ring; the other end of the washer being turned downwardly and slidably resting on the bed.

4. In a lock nut: a ring adapted to receive a shank of a bolt; the ring having a radial slot therein with an angular wall; the top of said ring having a shoulder in the slot opposite the angular wall; and a resilient split washer having a hook-shaped end substantially of the same width as the circumferential width of the slot but inclined at a greater angle than said angular wall and adapted to enter the slot when at the same inclination as said angular wall and having a groove to receive the shoulder of the ring as the hook is inserted into the slot; the washer having a curved raised portion disposed adjacent to the hook so that the curved portion has to be momentarily flattened to permit the hook to enter the slot; the groove and shoulder coacting to provide a fulcrum for swinging the hook into a position for sliding the inner wall thereof under the angular wall as the hook is pressed into the slot; the curved portion holding the inner wall of the hook against the angular wall of the slot for anchoring the washer to the ring.

5. In a lock nut: a nut adapted to be screwed onto the threaded shank of a bolt; the inner surface of the nut having notches therein; a ring surrounding the bolt shank and interposed between the nut and an object through which the shank extends; the ring having a radial slot therein and having projections adapted to engage with the object for preventing rotation of the ring; and a split spring washer having a hook-shaped end anchored in the slot for securing the washer to the ring as a unit; the washer being corrugated and defining raised portions yieldingly projecting into the notches of the nut; one of the raised portions being disposed adjacent to the hook, the angle of the hook being greater than the angular wall of the slot so that this portion has to be momentarily flattened to permit the hook to enter the slot.

EARLE VICTOR MORLEY.

References Cited in the file of this patent

UNITED STATES PATENTS

| Number | Name | Date |
|---|---|---|
| 150,801 | Sykes | May 12, 1874 |
| 348,569 | McHugh | Sept. 7, 1886 |
| 688,273 | Ward | Dec. 3, 1901 |
| 1,019,215 | Barclay | Mar. 5, 1912 |
| 1,210,758 | Brand | Jan. 2, 1917 |
| 1,616,338 | Steinkritzer | Feb. 1, 1927 |